(12) United States Patent
Okamoto et al.

(10) Patent No.: US 11,101,497 B2
(45) Date of Patent: Aug. 24, 2021

(54) ALL-SOLID STATE SECONDARY BATTERY AND METHOD FOR MANUFACTURING SAME

(71) Applicant: HITACHI ZOSEN CORPORATION, Osaka (JP)

(72) Inventors: Kenji Okamoto, Osaka (JP); Hideyuki Fukui, Osaka (JP); Yasushi Takano, Osaka (JP); Hirokazu Kawase, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 85 days.

(21) Appl. No.: 16/080,557

(22) PCT Filed: Feb. 24, 2017

(86) PCT No.: PCT/JP2017/006977
§ 371 (c)(1),
(2) Date: Aug. 28, 2018

(87) PCT Pub. No.: WO2017/150354
PCT Pub. Date: Sep. 8, 2017

(65) Prior Publication Data
US 2019/0051935 A1  Feb. 14, 2019

(30) Foreign Application Priority Data

Feb. 29, 2016 (JP) .............................. JP2016-036523
Mar. 30, 2016 (JP) .............................. JP2016-066957
Mar. 31, 2016 (JP) .............................. JP2016-069859

(51) Int. Cl.
*H01M 10/0562* (2010.01)
*H01M 4/70* (2006.01)
(Continued)

(52) U.S. Cl.
CPC ....... *H01M 10/0562* (2013.01); *H01M 4/364* (2013.01); *H01M 4/70* (2013.01);
(Continued)

(58) Field of Classification Search
CPC ......... H01M 10/0562; H01M 10/0565; H01M 4/70; H01M 2004/021; H01M 10/058;
(Continued)

(56) References Cited

U.S. PATENT DOCUMENTS 5,612,152 A * 3/1997 Bates .................. H01M 4/0447
429/152
7,153,611 B2  12/2006 Minami et al.
(Continued)

FOREIGN PATENT DOCUMENTS

CN       101136496 A      3/2008
CN       101657918 A      2/2010
(Continued)

OTHER PUBLICATIONS

International Search Report PCT/JP2017/006977 dated Mar. 28, 2017 with English translation.
(Continued)

*Primary Examiner* — Gregg Cantelmo
(74) *Attorney, Agent, or Firm* — Pillsbury Winthrop Shaw Pittman, LLP

(57) ABSTRACT

A method for manufacturing an all-solid state secondary battery including a plurality of provisional battery bodies, the method including: forming each of the plurality of provisional battery bodies by pressing a positive-electrode mixture, a solid electrolyte, and a negative-electrode mixture that are stacked between a pair of electrode current collectors and pressure-molding the stacked provisional battery
(Continued)

bodies with the electrode current collectors facing each other. The electrode current collectors facing each other have rough surfaces.

19 Claims, 8 Drawing Sheets

(51) Int. Cl.
  *H01M 10/0585* (2010.01)
  *H01M 4/36* (2006.01)
  *H01M 10/0525* (2010.01)
  *H01M 10/058* (2010.01)

(52) U.S. Cl.
  CPC ..... *H01M 10/058* (2013.01); *H01M 10/0525* (2013.01); *H01M 10/0585* (2013.01)

(58) Field of Classification Search
  CPC ............. H01M 10/0585; H01M 4/364; H01M 10/0525; H01M 2300/0068
  See application file for complete search history.

(56) References Cited

U.S. PATENT DOCUMENTS

| | | | | |
|---|---|---|---|---|
| 2004/0185336 A1* | 9/2004 | Ito | ................ | H01M 4/667 429/152 |
| 2005/0186473 A1* | 8/2005 | Mitchell | ................ | H01G 11/70 429/209 |
| 2007/0081299 A1* | 4/2007 | Zhong | ................ | H01G 11/26 361/502 |
| 2008/0070113 A1 | 3/2008 | Kondo et al. | | |
| 2009/0081553 A1* | 3/2009 | Kondo | ................ | H01M 2/021 429/314 |
| 2010/0040952 A1* | 2/2010 | Kimura | ................ | H01M 4/58 429/245 |
| 2010/0075209 A1* | 3/2010 | Kimura | ............... | H01M 2/1072 429/92 |
| 2010/0112456 A1 | 5/2010 | Kimura et al. | | |
| 2013/0040206 A1* | 2/2013 | Yoshida | ................ | H01M 2/145 429/307 |
| 2013/0149592 A1 | 6/2013 | Hayashi et al. | | |
| 2014/0193689 A1 | 7/2014 | Takami et al. | | |
| 2015/0340741 A1 | 11/2015 | Kim et al. | | |
| 2016/0181615 A1* | 6/2016 | Van Duren | ........... | H01M 4/661 429/232 |
| 2017/0179519 A1 | 6/2017 | Okamoto et al. | | |

FOREIGN PATENT DOCUMENTS

| | | |
|---|---|---|
| CN | 102859780 A | 1/2013 |
| EP | 2894705 A1 | 7/2015 |
| JP | 2001-126756 A | 5/2001 |
| JP | 2009-252548 A | 10/2009 |
| JP | 2010-15782 A | 1/2010 |
| JP | 2010-231969 A | 10/2010 |
| JP | 2011-154900 A | 8/2011 |
| JP | 5131686 B | 1/2013 |
| JP | 2015-060721 A | 3/2015 |
| JP | 2017-073374 A | 4/2017 |
| WO | 2012/020700 A1 | 2/2012 |
| WO | 2013/035525 A1 | 3/2013 |
| WO | 2013/140565 A1 | 9/2013 |
| WO | 2015/147122 A1 | 10/2015 |

OTHER PUBLICATIONS

Extended European Search Report dated Aug. 21, 2019 issued in corresponding EP Application No. 17759820.8.
Notice of Reasons for Refusal dated Jan. 7, 2020 issued in corresponding Japanese Patent Application No. 2016-066957 with English translation (6 pgs.).
EP Communication pursuant to Article 94(3) dated Jul. 21, 2020 issued in corresponding European Patent Application No. 17 759 820.8.
Office Action dated Nov. 2, 2020 issued in corresponding Chinese Patent Application No. 201780011523.8 with English translation (16 pgs.).

* cited by examiner

F I G. 3
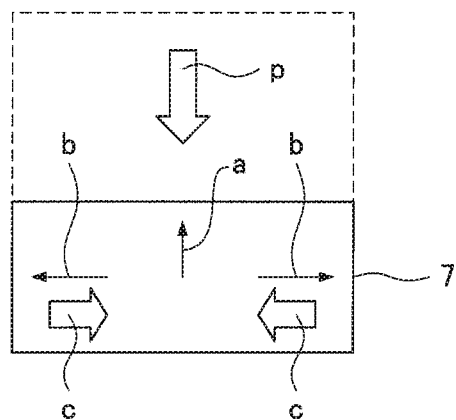
F I G. 4
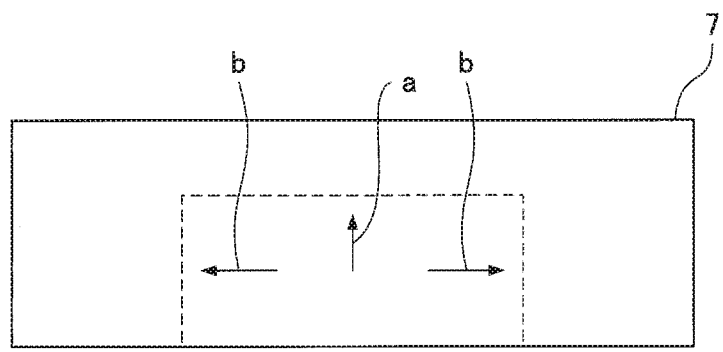

ALL-SOLID STATE SECONDARY BATTERY AND METHOD FOR MANUFACTURING SAME

CROSS-REFERENCE TO RELATED APPLICATIONS

This is the U.S. National Stage of PCT/JP2017/006977, filed Feb. 24, 2017, which in turn claims priority to Japanese Patent Application No. 2016-036523, filed Feb. 29, 2016, Japanese Patent Application No. 2016-066957, filed Mar. 30, 2016 and Japanese Patent Application No. 2016-069859 filed Mar. 31, 2016, the contents of each of these applications being incorporated herein by reference in their entireties.

TECHNICAL FIELD

The present invention relates to, for example, an all-solid state secondary, battery with a lithium-ion conductive solid electrolyte and a method for manufacturing the same.

BACKGROUND ART

In recent years, lithium-ion conductive solid electrolytes have been used as electrolytes for all-solid state secondary batteries. Such an all-solid state secondary battery includes a positive-electrode mixture layer, a negative-electrode mixture layer, a solid electrolyte layer, a positive-electrode current collector, and a negative-electrode current collector. In this configuration, the positive-electrode mixture layer is made of a positive-electrode active material and a lithium-ion conductive solid electrolyte. The negative-electrode mixture layer is made of a negative-electrode active material and a lithium-ion conductive solid electrolyte. The solid electrolyte layer is disposed between the positive-electrode mixture layer and the negative-electrode mixture layer. The positive-electrode current collector is metallic and is provided on a surface of the positive-electrode mixture layer. The negative-electrode current collector is metallic and is provided on a surface of the negative-electrode mixture layer.

For example, such an all-solid state secondary battery is manufactured follows: a powder positive-electrode mixture layer is charged into a cylindrical mold, a powder solid electrolyte is charged into the mold, a powder negative-electrode mixture layer is charged into the mold, and then the layers are pressure-molded under a high pressure with a retainer, e.g., a press pin.

According to the manufacturing method, a high-pressure press may generate an internal stress in the positive-electrode mixture layer and the negative-electrode mixture layer (hereinafter may be collectively referred to as "electrode mixture layer"). If a pressing force is released, the electrode mixture layer receives a frictional force caused by a difference in extension rate between the positive-electrode mixture and the negative-electrode mixture and between the positive-electrode current collector and the negative-electrode current collector. This may bend the battery in the thickness direction.

In a method for preventing such a bend, electrode mixture layers to be symmetrically deformed are disposed on both surfaces of a positive-electrode current collector and a negative-electrode current collector (hereinafter may be collectively referred to as "electrode current collector") so as to prevent bending of a battery (for example, see Patent Literature 1). If such a battery is manufactured as a dry-type battery, electrode mixture layers are formed on both surfaces of an electrode current collector by, for example, electrostatic coating.

CITATION LIST

Patent Literature

Patent Literature 1: Japanese Patent No. 5131686

SUMMARY OF INVENTION

Technical Problem

In the manufacturing method of Patent Literature 1, the electrode mixture layers are formed on both surfaces of the electrode current collector by electrostatic coating. Thus, in actual manufacturing, one surface electrostatically coated with an electrode mixture and then the current collector is inverted to electrostatically coat the other surface with an electrode mixture. When the current collector is inverted to electrostatically coat the other surface with the electrode mixture, the electrode mixture applied on one surface by electrostatic coating may fall off. In order to avoid such a problem, the electrode mixture may be applied to both surfaces of an erected electrode current collector by electrostatic coating. However, this may lead to an extremely complicated operation.

An object of the present invention is to provide a method for manufacturing an all-solid state secondary battery so as to easily prevent bending of the manufactured all-solid state secondary battery.

Solution to Problem

In order to solve the problem, a method for manufacturing an all-solid state secondary battery according to the present invention is a method for manufacturing an all-solid state secondary battery including a plurality of provisional battery bodies, the method including: forming each of the provisional battery bodies by pressing a positive-electrode mixture, a solid electrolyte, and a negative-electrode mixture that are stacked between a pair of electrode current collectors; and pressure-molding the stacked provisional battery bodies with the electrode current collectors facing each other, in which the electrode current collectors facing each other have rough surfaces.

Advantageous Effect of Invention

According to the method for manufacturing the all-solid state secondary battery of the present invention, the stacked provisional battery bodies are pressure-molded such that the electrode current collectors with rough surfaces face each other, so that the rough surfaces are fit (or engaged) into each other and a force of separating the provisional battery bodies by bending is canceled out, achieving the all-solid state secondary battery that is not bent even if a molding pressure is removed. This can easily prevent bending of the all-solid state secondary battery during manufacturing.

BRIEF DESCRIPTION OF DRAWINGS

FIG. 3 is an explanatory drawing of a mechanism for bending a provisional battery body.

FIG. 4 is an explanatory drawing of the mechanism for bending the provisional battery body.

DESCRIPTION OF EMBODIMENTS

First Embodiment

An all-solid state secondary battery and a method for manufacturing the same according to an embodiment of the present invention will be described below in accordance with the accompanying drawings.
(Process of Forming a Provisional Battery Body)

Figure 1:
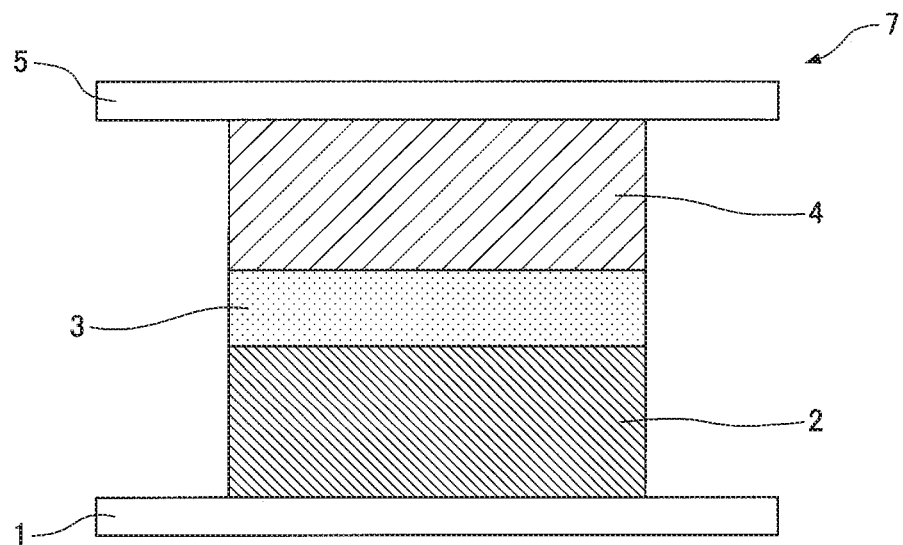
FIG. 1 is a cross-sectional view for explaining a method for manufacturing an all-solid state secondary battery according to a first embodiment of the present invention.

First, as shown in FIG. 1, a laminate is formed by stacking a positive-electrode current collector 1 composed of a thin metallic plate, a positive-electrode mixture layer 2 disposed on the top surface of the positive-electrode current collector 1, a lithium-ion conductive solid electrolyte layer 3 disposed on the top surface of the positive-electrode mixture layer 2, a negative-electrode mixture layer 4 disposed on the top surface of the solid electrolyte layer 3, and a negative-electrode current collector 5 composed of a thin metallic plate disposed on the top surface of the negative-electrode mixture layer 4.

The positive-electrode mixture layer 2, the solid electrolyte layer 3, and the negative-electrode mixture layer 4 are powder layers. In FIG. 1, hatching is omitted in the positive-electrode current collector 1 and the negative-electrode current collector 5. Hatching is omitted also in other drawings. The positive-electrode mixture layer 2, the solid electrolyte layer 3, and the negative-electrode mixture layer 4 may be formed by any specific methods including electrostatic screening, electrostatic spraying, and other methods of depositing powder.

The laminate is pressed (temporarily pressed) with a required force (e.g., a force of 0.1 to 100 MPa) so as to form a provisional battery body 7. In this configuration, rough surfaces (hereinafter may be referred to as irregular parts) are formed on both sides (both surfaces) of the positive-electrode current collector 1 and both sides of the negative-electrode current collector 5. The press engages (or fits) a powder positive-electrode mixture and a powder negative-electrode mixture into the irregular parts on the inner surfaces (a surface in contact with the positive-electrode mixture layer 2 or the negative-electrode mixture layer 4) of the current collectors. At this point, the pressing force is large enough not to deform the provisional battery body 7, so that, the provisional battery body 7 is substantially flat.
(Pressure Molding Process)

Figure 2:
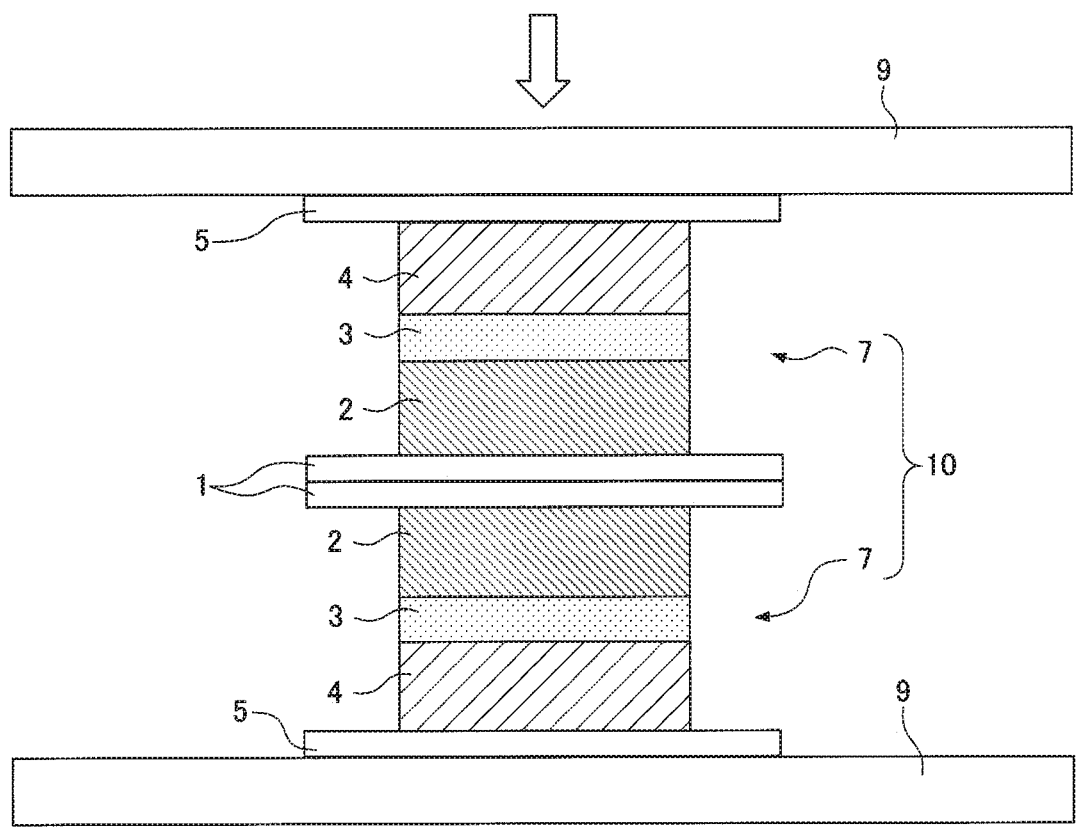
FIG. 2 is a cross-sectional view for explaining the method for manufacturing the all-solid state secondary battery according to the first embodiment of the present invention.

Subsequently, as shown in FIG. 2, the pair of provisional battery bodies 7 is stacked with the positive-electrode current collectors 1 in contact with each other and is pressure-molded with a predetermined molding pressure (e.g., a pressure of 100 to 1000 MPa). This process is performed, for example, by pressing the pair of provisional battery bodies 7 interposed between a pair of flat blocks 9.

Figure 5:
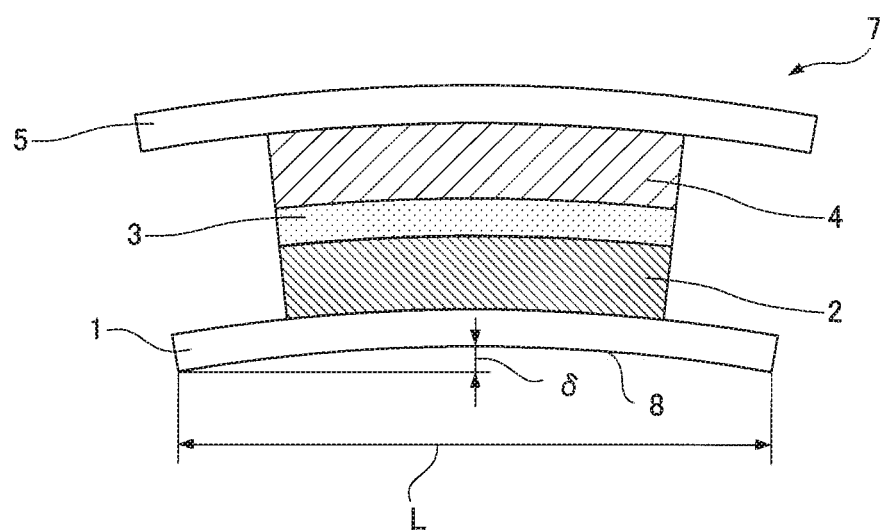
FIG. 5 is an explanatory drawing of the mechanism for bending the provisional battery body.

In this configuration, pressure molding on one of the provisional battery bodies 7 leads to bending of the provisional battery body 7. Referring to FIGS. 3 to 5, a mechanism for bending the provisional battery body 7 will be discussed below. For explanation, the single provisional battery body 7 will be described instead of the pair of provisional battery bodies 7.

In FIG. 3, a broken line indicates the provisional battery body 7 before the pressure-molding process and a solid line indicates the provisional battery body 7 during the pressure molding process. As shown in FIG. 3, application of a molding pressure p to compress the provisional battery body 7 generates a vertical internal stress a and a horizontal internal stress b. At this point, the provisional battery body 7 receives a frictional force c from the flat block. During the pressure molding process, the vertical internal stress a cancels out the molding pressure p, whereas the horizontal internal stress b cancels out the frictional force c.

In FIG. 4, a broken line indicates the provisional battery body 7 during the pressure molding process and a solid line indicates the provisional battery body 7 after the pressure molding process. When the molding pressure p in FIG. 3 is removed, the frictional force c is also removed at the same time. This releases the vertical internal stress a and the horizontal internal stress b as shown in FIG. 4. Thus, the provisional battery body 7 extends in the horizontal and vertical directions.

In this configuration, an extension rate in the horizontal direction depends on the materials of the layers and the particle diameter and thickness of the electrode mixture layer. If the extension rate of the negative-electrode mixture layer 4 exceeds that of the positive-electrode mixture layer 2, the molding pressure p is removed and the horizontal internal stress b is released. Thus, as shown in FIG. 5, the provisional battery body 7 deforms into an arc shape so as to expand the negative-electrode mixture layer 4 to the outside. In other words, a concave part 8 is formed on the positive-electrode current collector 1 of the provisional battery body 7.

Thus, in the present embodiment, the pair of provisional battery bodies 7 is pressure-molded with the positive-electrode current collectors 1 in contact with each other as shown in FIG. 2. The positive-electrode current collectors 1 have rough surfaces (irregular parts), so that the irregular parts on the surfaces of the positive-electrode current collectors 1 are fit (or engaged) into each other in the pressure molding process, so that the positive-electrode current collectors 1 are joined (bonded) to each other by the irregular parts. This cancels out a bending force that separates the provisional battery bodies 7, achieving an all-solid state secondary battery 10 that is not bent even if a molding pressure is removed. This configuration is particularly effective in the case of δ>0.06 L or δ>3 mm where δ is a battery deformation amount for pressing the provisional battery body 7 alone (a deformation amount δ of the electrode current collector, e.g., the positive-electrode current collector 1, see FIG. 5) and L is a battery width.

In this configuration, the positive-electrode mixture layer 2 is a mixture of a positive-electrode active material and a lithium-ion conductive inorganic solid electrolyte. The positive-electrode active material is an oxide, e.g., lithium cobalt oxide ($LiCoO_2$), lithium nickel oxide ($LiNiO_2$), or lithium manganese oxide ($LiMnO_2$). The inorganic solid electrolyte is a sulfide, e.g., $Li_2S$ (80 mol %)-$P_2S_5$ (20 mol %). The mixture ratio of the positive-electrode active material and the solid electrolyte ranges from 95:5 to 30:70, e.g., 70:30.

The negative-electrode mixture layer 4 contains' a mixture of a negative-electrode active material and a lithium-ion conductive inorganic solid electrolyte. The negative-electrode active material is, for example, a natural graphite, a synthetic graphite, a graphite carbon fiber, a carbon material, e.g., a resin baked carbon, silicon, tin, or lithium. The solid electrolyte is $Li_2S$ (80 mol %)—$P_2S_5$ (20 mol %) like the positive-electrode mixture layer 2. The mixture ratio of the negative-electrode active material and the solid electrolyte ranges from 95:5 to 30:70, e.g., 60:40.

As has been discussed, the solid electrolyte layer 3 contains $Li_2S$—$P_2S_5$ (a composition ratio of, for example, 80:20) that is an inorganic solid electrolyte of sulfide. The solid electrolyte has a distortion of at least 40% under compression at 1000 MPa.

Figure 6:
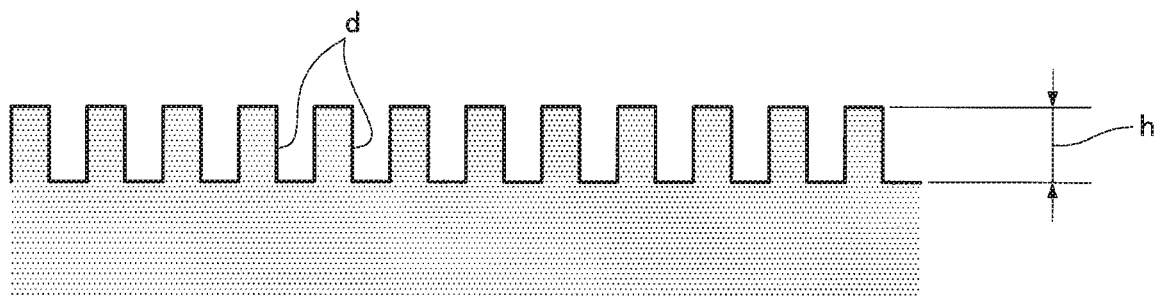
FIG. 6 is an explanatory drawing showing pits as an example of irregular parts.
Figure 7:
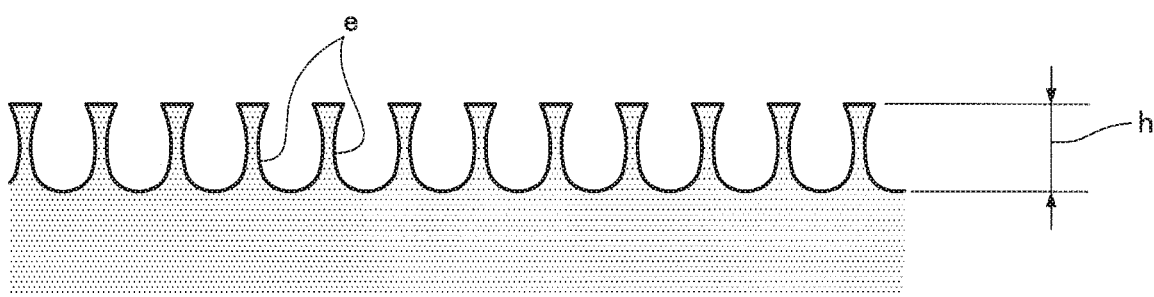
FIG. 7 is an explanatory drawing showing holes as an example of the irregular parts.
Figure 8:
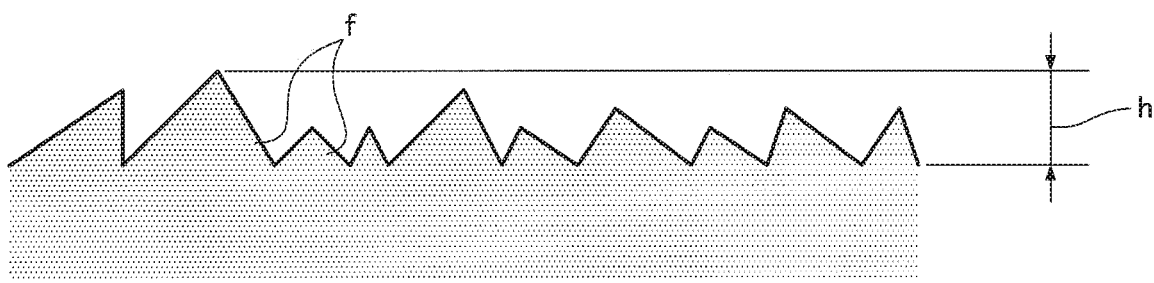
FIG. 8 is an explanatory drawing showing a zigzag pattern as an example of the irregular parts.

The positive-electrode current collector 1 contains, for example, etched aluminum (also referred to as surface electrolization aluminum foil) having a thickness of 20 μm. Both surfaces of the etched aluminum are, roughened. Specifically, as shown in FIG. 6, the surface is etched to have a larger area with a large number of pits (thin holes) d. In the roughening of etched aluminum, instead of the pits d, holes e expanding inward may be formed as shown in FIG. 7 or a zigzag pattern f with acute angles may be formed as shown in FIG. 8. The positive-electrode current collector 1 has a thickness of, for example, 5 to 40 μm, whereas a depth h of the pits d, the holes e, and the zigzag pattern f etc. can be set at 2 to 20 μm. The depth h is preferably set at 4 to 10 μm. The roughened surfaces are collectively referred to as irregular parts.

The negative-electrode current collector 5 includes a thin copper plate having a thickness of about 18 μm with roughened surfaces, that is, irregular parts. Specifically, roughening is performed on the surface of the negative-electrode current collector 5 so as to deposit copper particles. The copper plate is also referred to as surface electrolization copper foil. In this case, the depth of the irregular parts can be set at to 20 μm (not larger than the thickness of the negative-electrode current collector 5 if the thickness is 20 μm or less) and is preferably set at 4 to 10 μm.

For example, the all-solid state secondary battery 10 is entirely circular or square in shape. The specific size of the all-solid state secondary battery 10 is about 30 to 300 mm (a diameter if the battery is circular). The all-solid state secondary battery 10 has a thickness of, for example, about 0.6 to 5.0 mm.

In the present embodiment, the provisional battery bodies 7 are pressure-molded while the positive-electrode current collectors 1 having the concave parts 8 face each other. The present invention is not limited to this configuration. For example, if the extension rate of the positive-electrode mixture layer 2 exceeds that of the negative-electrode mixture layer 4, a concave part is formed on the negative-electrode current collector 5. In this case, in order to place the concave parts facing each other, the negative-electrode current collectors 5 are caused to face each other instead of the positive-electrode current collectors 1.

The provisional battery bodies 7 are stacked with the concave parts facing each other. The present invention is not limited to this configuration. In other words, convex parts on the opposite sides from the concave parts may be stacked so as to face each other.

Moreover, the positive-electrode current collector 1 and the negative-electrode current collector 5 may face each other. In this case, in the pressure molding process, the pair of provisional battery bodies 7 tends to bend in the same direction and thus the bending of the all-solid state secondary battery may not be prevented. However, pressure molding on the provisional battery bodies 7 generates a frictional force between the electrode current collectors 1 and 5. The frictional force is generated when the rough surfaces of the electrode current collectors 1 and 5 bite into each other. When molding pressure is removed, an internal stress is released so as to bend the provisional battery bodies 7. This force is canceled out by the frictional force. Thus, the all-solid state secondary battery can be achieved without being bent.

Both surfaces of the electrode current collectors 1 and 5 are not always entirely roughened. Of the surfaces of the electrode current collectors 1 and 5, roughening may be performed only on the surfaces in contact with the electrode mixture layers 2 and 4 or the surfaces joined to the electrode current collectors 1 and 5 of the other provisional battery body 7. In other words, these surfaces need to be rough so that the powder of the electrode mixture layers 2 and 4 or the irregular parts of the electrode current collectors 1 and 5 of the other provisional battery body 7 bite into the irregular parts of the electrode current collectors 1 and 5 to obtain bonding power. Roughening is not necessary on the surfaces not in contact with the electrode mixture layers 2 and 4 and the surfaces not joined to the electrode current collectors 1 and 5 of the other provisional battery body 7.

Second Embodiment

Figure 9:
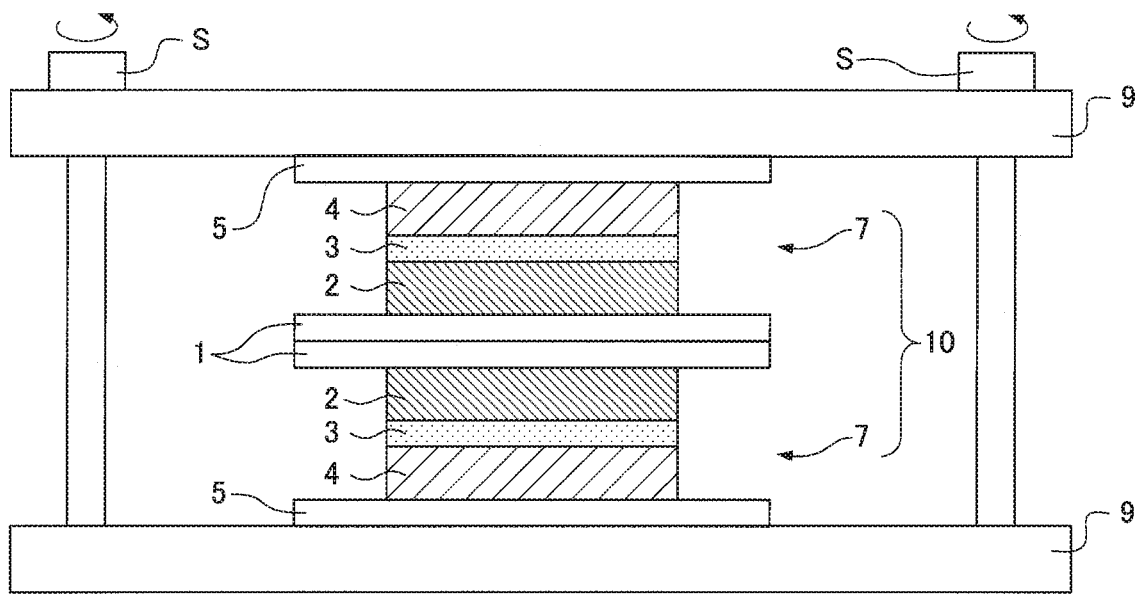
FIG. 9 is a cross-sectional view for explaining a method for manufacturing an all-solid state secondary battery according to a second embodiment of the present invention.

A method for manufacturing an all-solid state secondary battery according to a second embodiment will be described below. The explanation of the same configurations as those of the first embodiment is omitted and different configurations will be mainly discussed below. In the first embodiment, the rough surfaces (irregular parts) are formed on the electrode current collectors 1 and 5. The irregular parts are fit into each other so as to prevent bending of the all-solid state secondary battery 10. In addition to this, in the second embodiment, as shown in FIG. 9, a pressure not higher than the pressure of pressure molding is continuously applied to provisional battery bodies 7 after a pressure molding process, thereby more effectively preventing bending of an all-solid state secondary battery. The detail will be discussed below.

As described with FIGS. 3 and 4, when a molding pressure p is removed, a frictional force c is also removed at the same time. This releases a vertical internal stress a and a horizontal internal stress b as shown in FIG. 4. Thus, the provisional battery body 7 extends in the horizontal and vertical directions but the extension of electrode mixture layers 2 and 4 requires a certain time period. In other words, the internal stresses a and b are not instantly released but are gradually released according to the extension of the electrode mixture layers 2 and 4 while being accumulated as a residual stress. The extension of the provisional battery body 7 in the vertical direction is negligible because the provisional battery body 7 has a thickness of about 100 to 500 However, the extension in the horizontal direction is not negligible because the provisional battery body 7 has a width of about 30 to 300 mm.

Figure 10:
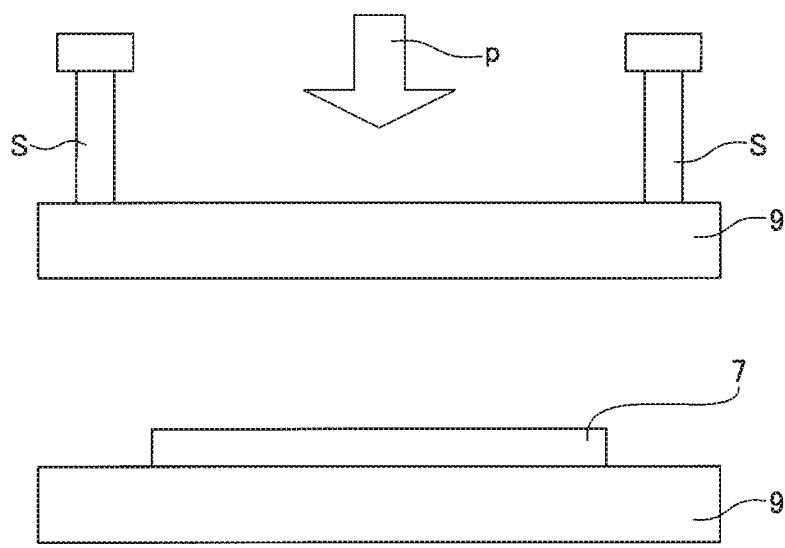
FIG. 10 is an explanatory drawing of a mechanism for preventing bending of a provisional battery body.
Figure 11:
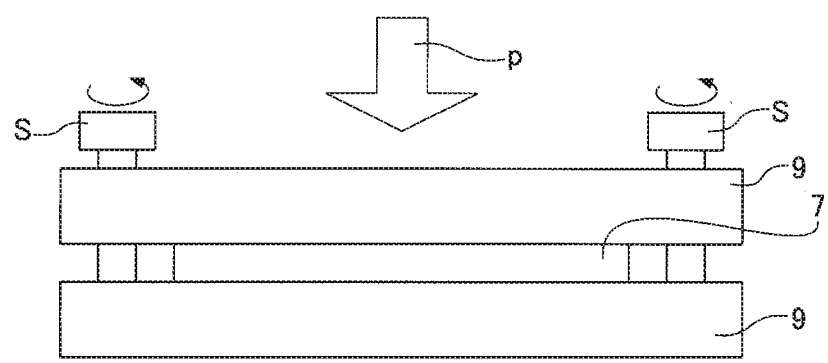
FIG. 11 is an explanatory drawing of the mechanism for preventing bending of the provisional battery body.

If the shape of the provisional battery body 7 is kept for a certain time without completely removing the molding pressure p, the residual stress is reduced without causing deformation. FIGS. 10 and 11 show a specific method of keeping the shape of the provisional battery body 7. In FIG. 10, a pair of flat blocks (jigs) 9 is used in the pressure molding process. The molding pressure p is applied to the provisional battery body 7 held between the flat blocks 9. Subsequently, in FIG. 11, the flat blocks 9 are fixed to each other with screws S while the molding pressure p is applied. Then, the molding pressure p is removed. At this point, the shape of the provisional battery body 7 is kept by the weight of the flat block 9 and the applied pressure of the screw S. In this case, the weight of the flat block 9 and the applied pressure (hereinafter will be referred to as a shape keeping pressure) of the screw S are not larger than, for example, 1000 N (converted to a pressure of 0.1 MPa or less) for a battery measuring 100 mm per side.

Figure 12:
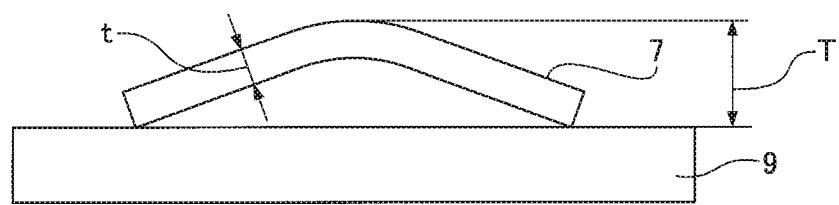
FIG. 12 shows the bent provisional battery body.

Table 1 shows the relationship between a time during which the flat blocks 9 fixed with the screws S are left after the molding pressure p is removed (relaxation time) and a bending amount of the provisional battery body 7. In this case, the bending amount is a value determined by subtracting a battery thickness t from an overall height T (see FIG. 12) of the provisional battery body 7. Moreover, the molding pressure p is set at 1000 MPa. The shape keeping pressure is hard to maintain and thus is set within the range of 50 to 1000 N (converted to a pressure of 0.005 to 0.1 MPa) for a battery measuring 100 mm per side. The numeric values of the pressures are not set in consideration of an atmospheric pressure. As shown in Table 1, when the relaxation time is at least two hours, the bending amount can be reduced to a half or less as compared with the relaxation time of 0.5 hours or one hour.

TABLE 1

| | Relaxation time [hour] | | | |
|---|---|---|---|---|
| | 0.5 | 1 | 2 | 48 |
| Bending amount [mm] | 4-6 | 4-6 | 1.5-2.5 | 1.5-2 |

This result holds for the pair of provisional battery bodies 7 as well as the single provisional battery body 7. Thus, the method for manufacturing the all-solid state secondary battery according to the present embodiment includes the step of continuously applying a pressure (shape keeping pressure) not higher than the molding pressure p for at least two hours without completely removing the pressure after the step of pressure-molding the pair of provisional battery bodies 7. This reduces a residual stress on the pair of provisional battery bodies 7 without deforming the provisional battery bodies 7. Thus, the present embodiment can more effectively prevent bending of the pair of provisional battery bodies 7 than the first embodiment.

In a specific configuration for keeping the shape of the pair of provisional battery bodies 7, as shown in FIG. 9, the pair of flat blocks 9 is fixed with the screws S, the pair of provisional battery bodies 7 is held between the flat blocks 9, and the shape keeping pressure is applied by the weight of the flat block 9 and the applied pressure of the screw S. In this case, it is not necessary to continuously apply a pressure to the pair of provisional battery bodies 7 and the shape of the pair of provisional battery bodies 7 can be kept without any pressure. However, the shape keeping pressure may be continuously applied to the provisional battery bodies 7 with press pins or the like.

In the above description, the shape keeping pressure is continuously applied for at least two hours (relaxation time). The relaxation time depends on the size of the provisional battery body 7 and the extension rates of the configurations and is properly determined by these factors. According to the result of Table 1, particularly if the provisional battery body 7 is about 30 to 300 mm in width and is made of the foregoing materials, it is decided that the application of the shape keeping pressure is preferably continued for at least two hours.

Third Embodiment

Figure 13:
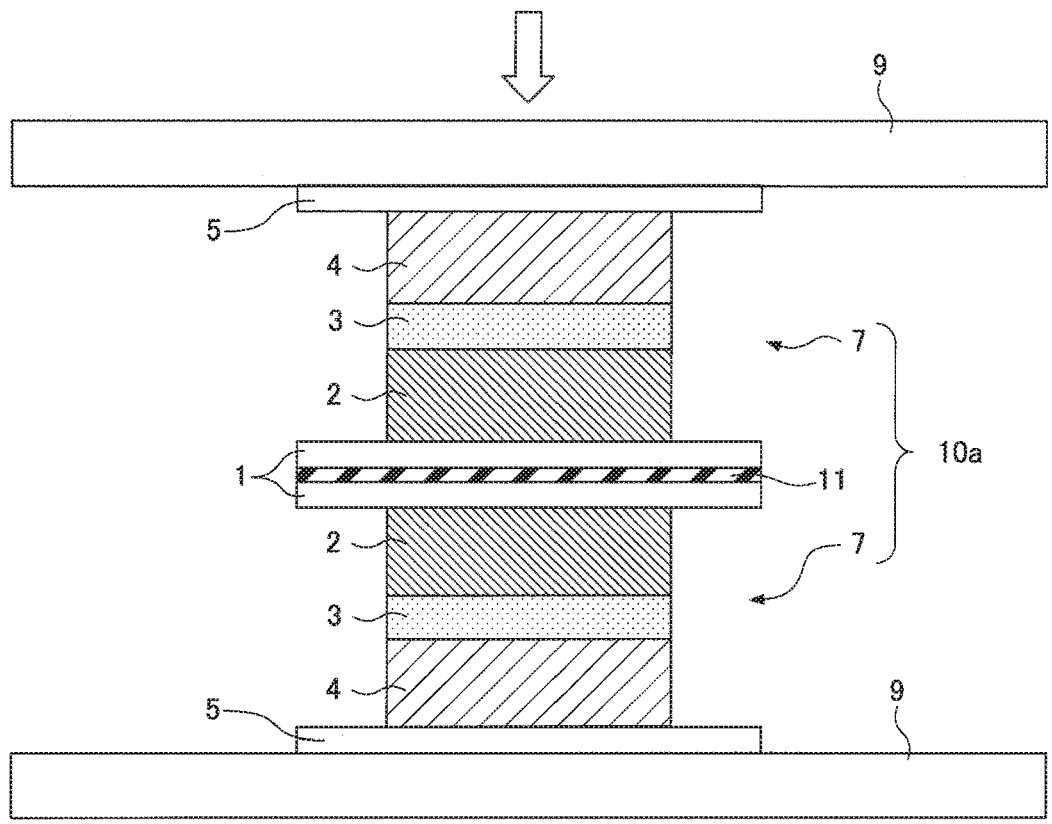
FIG. 13 is a cross-sectional view for explaining a method for manufacturing an all-solid state secondary battery according to one of the third and fourth embodiments of the present invention.

A method for manufacturing an all-solid state secondary battery according to a third embodiment will be described below. The explanation of the same configurations as those of the first embodiment is omitted and different configurations will be mainly discussed below. In the first embodiment, the rough surfaces (irregular parts) are formed on the electrode current collectors 1 and 5. The irregular parts are fit into each other so as to join the electrode current collectors 1 and 5. In the third embodiment, as shown in FIG. 13, rough surfaces (irregular parts) are formed on electrode current collectors 1 and 5 and stacked provisional battery bodies 7 are pressure-molded with a binder 11 interposed between the electrode current collectors 1 and 5, thereby joining the electrode current collectors 1 and 5. In this configuration, the binder 11 is a plastically deformable material, e.g., a resin sheet.

An all-solid state secondary battery 10a manufactured by this method includes the binder interposed between the electrode current collectors 1 and 5 facing each other in addition to the configurations of the all-solid state secondary batteries 10 manufactured by the methods of the first and second embodiments. According to the method for manufacturing the all-solid state secondary battery 10a of the present embodiment, the binder 11 is plastically deformed to bite into the irregular parts on the outer surface (the surface opposite from the surface bearing the positive-electrode mixture layer 2') of the positive-electrode current collector 1 by the pressure molding process, thereby firmly joining the positive-electrode current collectors 1 by an anchor effect. Thus, the positive-electrode current collectors 1 are joined into a single unit via the binder 11. This can cancel out a force of bending the provisional battery bodies 7, achieving the all-solid state secondary battery 10a having no curves.

Figure 14:
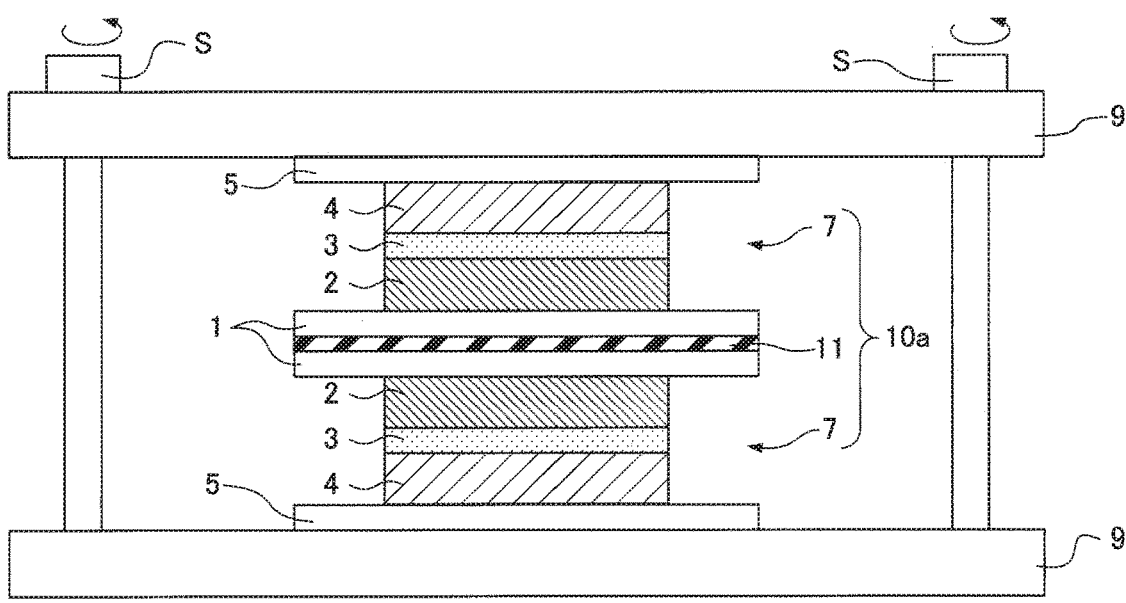
FIG. 14 is a cross-sectional view for explaining a preferable configuration for the method for manufacturing the all-solid state secondary battery according to one of the third and fourth embodiments of the present invention.

Also in the third embodiment, as shown in FIG. 14, a pressure not higher than the pressure of pressure molding is continuously applied to the provisional battery bodies after the pressure molding process, thereby more effectively preventing bending of the all-solid state secondary battery 10a as in the second embodiment.

The binder 11 is not limited to a plastically deformable material. Flowable materials such as adhesive and solder may be used instead. If the electrode current collectors 1 and 5 have irregular parts and the binder 11 is a fluid adhesive or solder, the binder 11 flown onto the irregular parts is hardened to generate bonding power by an anchor effect.

Fourth Embodiment

A method for manufacturing an all-solid state secondary battery according to a fourth embodiment will be described below. The explanation of the same configurations as those of the third embodiment is omitted and different configurations will be mainly discussed below. In the third embodiment, the rough surfaces (irregular parts) are formed on the electrode current collectors 1 and 5 and the stacked provisional battery bodies 7 are pressure-molded with the binder 11 interposed between the electrode current collectors 1 and 5. In the fourth embodiment, rough surfaces (irregular parts) are not formed on the electrode current collectors and 5 and stacked provisional battery bodies 7 are pressure-molded with a binder 11 interposed between the electrode current collectors 1 and 5.

If the surfaces of the electrode current collectors 1 and 5 are not roughened, bonding power generated by an anchor effect is not expected but the electrode current collectors 1 and 5 can be joined to each other by other joining methods using, for example, an electrostatic force, reduced-pressure suction, or chemical bonding. The electrostatic force can be obtained by triboelectrification on the binder 11. For example, the reduced-pressure suction is obtained using the principle of suckers such that the binder 11 having fine holes on its surface is pressed to discharge air from the fine holes to the outside. The chemical bonding is, for example, a Van der Waals force or a covalent bond. Alternatively, these joining methods may be combined to loin the electrode current collectors. The binder 11 of the present embodiment is, for example, double-faced tape. The adhesion of the tape joins the electrode current collectors 1 and 5, thereby achieving the all state secondary battery having no curves.

Also in the fourth embodiment, a pressure not higher than the pressure of pressure molding is continuously applied to the provisional battery bodies 7 after a pressure molding process, thereby more effectively preventing bending of the all-solid state secondary battery as in the second embodiment.

In the first to fourth embodiments, the all-solid state secondary battery 10 includes the two provisional battery bodies 7. The number of provisional battery bodies is not limited to two. The all-solid state secondary battery may include three or more provisional battery bodies 7. In the case of three or more provisional battery bodies, the negative-electrode current collectors 5 are also joined to each other as well as the positive-electrode current collectors 1 facing each other.

In the methods of manufacturing the all-solid state secondary battery 10 (or 10a) according to the first to fourth embodiments, the laminate is temporarily pressed to form the provisional battery bodies 7 and then the pair of provisional battery bodies 7 is further pressure-molded, achieving the all-solid state secondary battery (or 10a). Alternatively, the all-solid state secondary battery 10 (10a) may be obtained by pressure-molding a pair of laminates without temporarily pressing the formed laminates. In other words, instead of temporarily pressing the laminates to form the individual provisional battery bodies 7, the pair of stacked laminates is pressed to obtain the all-solid state secondary battery 10 while forming the pair of provisional battery bodies 7. The manufacturing methods of the first to fourth embodiments require three presses: a temporary press on one of the provisional battery bodies 7, a temporary press on the other provisional battery body 7, and a press (pressure molding) on the stacked provisional battery bodies 7. According to the alternative manufacturing method, the all-solid state secondary battery 10 can be achieved by a single press (pressure molding), thereby improving the productivity of the all-solid state secondary battery.

Figure 15:
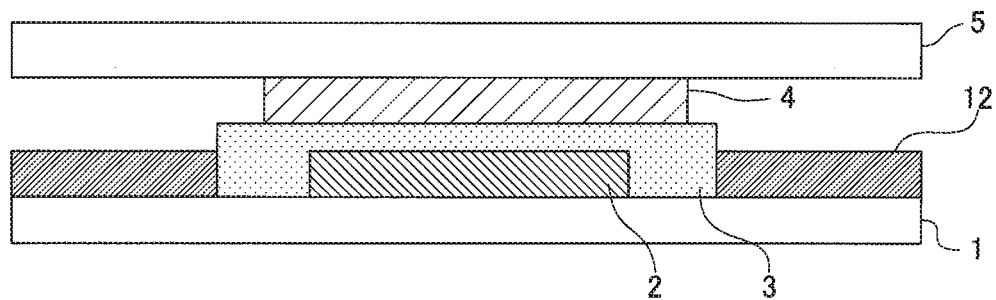
FIG. 15 is a cross-sectional view of the deformed provisional battery body according to one of the third and fourth embodiments of the present invention.

In the foregoing explanation, for the clarity, the electrode current collectors 1 and 5, the electrode mixture layers 2 and 4, and the solid electrolyte layer are simply stacked in the descriptions and drawings. More specifically, the layers are stacked in a cross-sectional structure shown in FIG. 15. Specifically, the positive-electrode mixture layer 2 is disposed at the center of the top surface of the positive-electrode current collector 1, the solid electrolyte layer 3 is disposed over the positive-electrode mixture layer 2, an insulating member (insulating film) 12 is disposed over the positive-electrode current collector 1 around the solid electrolyte layer 3, the negative-electrode mixture layer 4 is disposed on the top surface of the solid electrolyte layer 3, and the negative-electrode current collector 5 substantially as large as the positive-electrode current collector 1 is disposed on the top surface of the negative-electrode mixture layer 4.

The invention claimed is:

1. A method for manufacturing an all-solid state secondary battery including a plurality of provisional battery bodies, the method comprising:
    forming each of the provisional battery bodies by pressing a positive-electrode mixture, a solid electrolyte, and a negative-electrode mixture that are stacked between a positive-electrode current collector and a negative-electrode current collector, each of the positive-electrode current collector and the negative-electrode current collector having an inner surface and an outer surface, the inner surface of the positive-electrode current collector facing the inner surface of the negative-electrode current collector, the inner surface of the positive-electrode current collector being in contact with the positive-electrode mixture, and the inner surface of the negative-electrode current collector being in contact with the negative-electrode mixture; and
    pressure-molding with a molding pressure a pair of stacked provisional battery bodies, the pair of stacked provisional battery bodies including a first provisional battery body and a second provisional battery body;
    wherein the positive-electrode mixture of each of the provisional battery bodies is configured to extend at a first extension rate when the molding pressure is removed;
    wherein the negative-electrode mixture of each of the provisional battery bodies is configured to extend at a second extension rate when the molding pressure is removed;
    wherein the pair of stacked provisional battery bodies is arranged with the outer surface of a first current collector of the first provisional battery body directly engaged with the outer surface of a second current collector of the second provisional battery body,
    wherein the first current collector corresponds to a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, wherein the second current collector corresponds a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, and wherein the first and second current collectors are directly engaged during the pressure-molding to prevent bending caused due to forces induced by the pressure-molding, the outer surfaces of the directly engaged electrode current collectors being roughed.

2. The method for manufacturing an all-solid state secondary battery according to claim 1, further comprising continuously applying a pressure not higher than the molding pressure after the pressure-molding.

3. The method for manufacturing an all-solid state secondary battery according to claim 1, wherein when the outer surfaces of the positive-electrode current collectors are roughed, the outer surfaces of the positive-electrode current collectors comprise shaped patterns having a depth in a range 2 µm to 20 µm; and wherein when the outer surfaces of the negative-electrode current collectors are roughed, the outer surfaces of the negative-electrode current collectors comprise shaped patterns having a depth in a range 2 µm to 20 µm.

4. The method for manufacturing an all-solid state secondary battery according to claim 3, wherein the patterns of the outer surfaces comprises pits, holes, or zigzag patterns sized to engage the electrode current collectors into each other and to cancel out bending forces induced by the pressure-molding.

5. The method for manufacturing an all-solid state secondary battery according to claim 1, wherein the pressure-molding is performed under the molding pressure in a range 100 to 1000 MPa.

6. The method for manufacturing an all-solid state secondary battery according to claim 1, wherein at least one of the inner surface of the positive-electrode current collector of each of the provisional battery bodies or the inner surface of the negative-electrode current collector of each of the provisional battery bodies is roughed.

7. The method for manufacturing an all-solid state secondary battery according to claim 1, wherein the first extension rate exceeds the second extension rate, and wherein the pair of stacked provisional battery bodies is arranged with the outer surfaces of the positive-electrode current collectors of each provisional battery body associated with the positive-electrode mixture directly engaging one another during the pressure-molding to prevent said bending caused due to forces induced by the pressure-molding, the outer surfaces of the directly engaging positive-electrode current collectors being roughed.

8. The method for manufacturing an all-solid state secondary battery according to claim 1, wherein the second extension rate exceeds the first extension rate, and wherein the pair of stacked provisional battery bodies is arranged with the outer surfaces of the negative-electrode current collectors of each provisional battery body associated with the negative-electrode mixture directly engaging one another during the pressure-molding to prevent said bending caused due to forces induced by the pressure-molding, the outer surfaces of the directly engaging negative-electrode current collectors being roughed.

9. The method for manufacturing an all-solid state secondary battery according to claim 1, wherein the provisional battery bodies are formed under a pressure in a range 0.1 to 100 MPa.

10. The method for manufacturing an all-solid state secondary battery according to claim 1, wherein the provisional battery bodies are formed under a pressure in a range 0.1 to 100 MPa; and wherein the pressure-molding is performed under the molding pressure in a range 100 to 1000 MPa.

11. An all-solid state secondary battery comprising:

a plurality of provisional battery bodies, each including a positive-electrode mixture layer, a negative-electrode mixture layer, a solid electrolyte layer disposed between the positive-electrode mixture layer and the negative-electrode mixture layer, a positive-electrode current collector and a negative-electrode current collector, each of the positive-electrode current collector and the negative-electrode current collector having an inner surface and an outer surface, the inner surface of the positive-electrode current collector facing the inner surface of the negative-electrode current collector, the inner surface of the positive-electrode current collector being in contact with the positive-electrode mixture, and the inner surface of the negative-electrode current collector being in contact with the negative-electrode mixture, wherein a pair of provisional battery bodies are stacked, the pair of stacked provisional battery bodies including a first provisional battery body and a second provisional battery body, wherein the first provisional battery body is engaged with the second provisional battery bodies in a pressure-molding based on a molding pressure and extension rates associated with the positive-electrode mixture and the negative-electrode mixture, wherein the positive-electrode mixture of each of the provisional battery bodies is configured to extend in a first extension rate when the molding pressure is removed;

wherein the negative-electrode mixture of each of the provisional battery bodies is configured to extend in a second extension rate when the molding pressure is removed;

wherein the pair of stacked provisional battery bodies is arranged with the outer surface of a first current collector of the first provisional battery body directly engaged with the outer surface of a second current collector of the second provisional battery body, wherein the first current collector corresponds to a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, wherein the second current collector corresponds a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, and wherein the first and second current collectors are directly engaged during the pressure-molding to prevent bending caused due to forces induced by the pressure-molding, the outer surfaces of the directly engaged electrode current collectors being roughed.

12. The all-solid state secondary battery according to claim 11,
wherein when the outer surfaces of the positive-electrode current collectors are roughed, the outer surfaces of the positive-electrode current collectors comprise shaped patterns having a depth in a range 2 μm to 20 μm; and
wherein when the outer surfaces of the negative-electrode current collectors are roughed, the outer surfaces of the negative-electrode current collectors comprise shaped patterns having a depth in a range 2 μm to 20 μm.

13. A method for manufacturing an all-solid state secondary battery including a plurality of provisional battery bodies, the method comprising:
forming each of the provisional battery bodies by pressing a positive-electrode mixture, a solid electrolyte, and a negative-electrode mixture that are stacked between a positive-electrode current collector and a negative-electrode current collector, each of the positive-electrode current collector and the negative-electrode current collector having an inner surface and an outer surface, the inner surface of the positive-electrode current collector facing the inner surface of the negative-electrode current collector, the inner surface of the positive-electrode current collector being in contact with the positive-electrode mixture, and the inner surface of the negative-electrode current collector being in contact with the negative-electrode mixture; and
pressure-molding with a molding pressure a pair of stacked provisional battery bodies, the pair of stacked provisional battery bodies including a first provisional battery body and a second provisional battery body
wherein the positive-electrode mixture of each of the provisional battery bodies is configured to extend in a first extension rate when the molding pressure is removed;
wherein the negative-electrode mixture of each of the provisional battery bodies is configured to extend in a second extension rate when the molding pressure is removed;
wherein the pair of stacked provisional battery bodies is arranged with the outer surface of a first current collector of the first provisional battery body joined by a binder to the outer surface of a second current collector of the second provisional battery body,
wherein the first current collector corresponds to a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body,
wherein the second current collector corresponds a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, and
wherein the first and second current collectors are joined during the pressure-molding to prevent bending caused due to forces induced by the pressure-molding, the outer surfaces of the joined electrode current collectors being roughed.

14. The method for manufacturing an all-solid state secondary battery according to claim 13, wherein the first extension rate exceeds the second extension rate, and wherein the pair of stacked provisional battery bodies is arranged with the outer surfaces of the positive-electrode current collectors of each provisional battery body associated with the positive-electrode mixture are joined by the binder with one another during the pressure-molding to prevent said bending caused due to forces induced by the pressure-molding, the outer surfaces of the positive-electrode current collectors being roughed.

15. The method for manufacturing an all-solid state secondary battery according to claim 13, wherein the second extension rate exceeds the first extension rate, and wherein the pair of stacked provisional battery bodies is arranged with the outer surfaces of the negative-electrode current collectors of each provisional battery body associated with the negative-electrode mixture are joined by the binder with one another during the pressure-molding to prevent said bending caused due to forces induced by the pressure-molding, the outer surfaces of the negative-electrode current collectors being roughed.

16. The method for manufacturing an all-solid state secondary battery according to claim 13, wherein the provisional battery bodies are formed under a pressure in a range 0.1 to 100 MPa.

17. The method for manufacturing an all-solid state secondary battery according to claim 13, wherein the pressure-molding is performed under the molding pressure in a range 100 to 1000 MPa.

18. The method for manufacturing an all-solid state secondary battery according to claim 13, wherein the provisional battery bodies are formed under a pressure in a range 0.1 to 100 MPa; and
wherein the pressure-molding is performed under the molding pressure in a range 100 to 1000 MPa.

19. An all-solid state secondary battery comprising:
a plurality of provisional battery bodies, each including a positive-electrode mixture layer, a negative-electrode mixture layer, a solid electrolyte layer disposed between the positive-electrode mixture layer and the negative-electrode mixture layer, a positive-electrode current collector and a negative-electrode current collector, each of the positive-electrode current collector and the negative-electrode current collector having an inner surface and an outer surface, the inner surface of the positive-electrode current collector facing the inner surface of the negative-electrode current collector, the inner surface of the positive-electrode current collector being in contact with the positive-electrode mixture, and the inner surface of the negative-electrode current collector being in contact with the negative-electrode mixture,
wherein a pair of provisional battery bodies are stacked, the pair of stacked provisional battery bodies including a first provisional battery body and a second provisional battery body,
wherein the first provisional battery body is engaged with the second provisional battery body joined by a binder interposed therebetween in a pressure-molding based on a molding pressure and extension rates associated with the positive-electrode mixture and the negative-electrode mixture, wherein the positive-electrode mixture of each of the provisional battery bodies is configured to extend in a first extension rate when the molding pressure is removed;

wherein the negative-electrode mixture of each of the provisional battery bodies is configured to extend in a second extension rate when the molding pressure is removed;

wherein the pair of stacked provisional battery bodies is arranged with the outer surface of a first current collector of the first provisional battery body joined by a binder to the outer surface of a second current collector of the second provisional battery body, wherein the first current collector corresponds to a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, wherein the second current collector corresponds a current collector that is in contact with an electrode mixture having lower of the first extension rate and the second extension rate, the current collector being the positive current collector or the negative current collector, and the electrode mixture being the positive electrode mixture or the negative electrode mixture within the first provisional battery body, and wherein the first and second current collectors are joined during the pressure-molding to prevent bending caused due to forces induced by the pressure-molding, the outer surfaces of the joined electrode current collectors being roughed.

* * * * *